(12) United States Patent
DeVito et al.

(10) Patent No.: US 8,053,735 B2
(45) Date of Patent: Nov. 8, 2011

(54) OPTIMIZED CASE SPECIFIC SPECT SAMPLING

(75) Inventors: Raymond P. DeVito, North Logan, UT (US); Timothy Edwin Doyle, Pleasant View, UT (US)

(73) Assignee: Utah State University, North Logan, UT (US)

( * ) Notice: Subject to any disclaimer, the term of this patent is extended or adjusted under 35 U.S.C. 154(b) by 518 days.

(21) Appl. No.: 12/340,101

(22) Filed: Dec. 19, 2008

(65) Prior Publication Data

US 2010/0155608 A1 Jun. 24, 2010

(51) Int. Cl.
*G01T 1/166* (2006.01)

(52) U.S. Cl. .................................. 250/363.04

(58) Field of Classification Search .............. 250/361 R, 250/362, 363.02, 363.03, 363.04, 363.07, 250/363.09
See application file for complete search history.

(56) References Cited

U.S. PATENT DOCUMENTS

2008/0149839 A1* 6/2008 Conwell ................. 250/362
* cited by examiner

*Primary Examiner* — Mark R Gaworecki

(57) ABSTRACT

A method for improving single photon emission computed tomography by controlling acquisition parameters specific to the imaging goals and specific to the individual case under study. Data acquisition is modulated by scanning to adapt to the particular signal to noise characteristics of each object. A preliminary acquisition quickly scans the object of interest. The preliminary data is analyzed to optimize the secondary scan. The secondary scan is then acquired with optimized sampling of the object based on its own particular image characteristics. The system is able to learn, incorporating site specific data into a triaging set.

19 Claims, 2 Drawing Sheets

FFBP = Fast filtered back-projection

OPTIMIZED CASE SPECIFIC SPECT SAMPLING

TECHNICAL FIELD

This present invention relates to methods for improving single photon emission computed tomography (SPECT). In particular this invention relates to methods for improving image fidelity by controlling SPECT data input characteristics specific to the imaging goals and specific to the individual case under study.

BACKGROUND

Nuclear Medicine's capability to present functional information has made it a valuable tool for clinical diagnosis and for biological research. It is desirable to improve system performance and various methods have been employed. Collimation techniques such as multiple pinholes or converging collimators can improve resolution for certain classes of study. Sensitivity can be improved with larger detector areas or diverging collimation. It is further useful if the imaging system can adapt to the actual source distributions of a specific case to optimize tomographic signal to noise by acquiring data selectively to dwell longer on source areas that contribute more information to the final image.

With some imaging methods gaps may appear in the angular sampling for portions of the object field. This type of reconstruction problem has been previously addressed in nuclear medicine. For example, fanbeam and conebeam collimators tend to produce truncated planar images that do not fully sample the sinogram.

Data acquisition methods for SPECT rely on a preset definition of dwell time, angular step, collimation and range of orbital sampling. These data acquisition protocols are variable as to type of study performed but are not case by case specific to the actual source distribution in a patient or subject of interest. As such they do not optimize the imaging results for a specific patient or subject of interest. Such data acquisition protocols can be non-uniform in their dwell time per step but are not varying due to the specific source distribution in an individual patient.

SUMMARY OF THE INVENTION

This disclosure aims to advance the development of high-resolution SPECT imaging by implementing an optimized scanning method. Data acquisition is modulated by scanning to adapt to the particular signal to noise characteristics of each object. A preliminary acquisition quickly scans the object to determine regions of high count density, regions of high spatial frequency and regions of low spatial frequency. A secondary scan is then acquired with optimized sampling of the object based on its own particular image characteristics. For example, in one embodiment, to deliver the case specific scan data a neural net is employed. The neural net has been trained for a particular type of study and study objectives. The neural net training may be augmented by incorporating newly acquired data into the triaging set.

DESCRIPTION OF THE FIGURES

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF THE INVENTION

Figure 1:
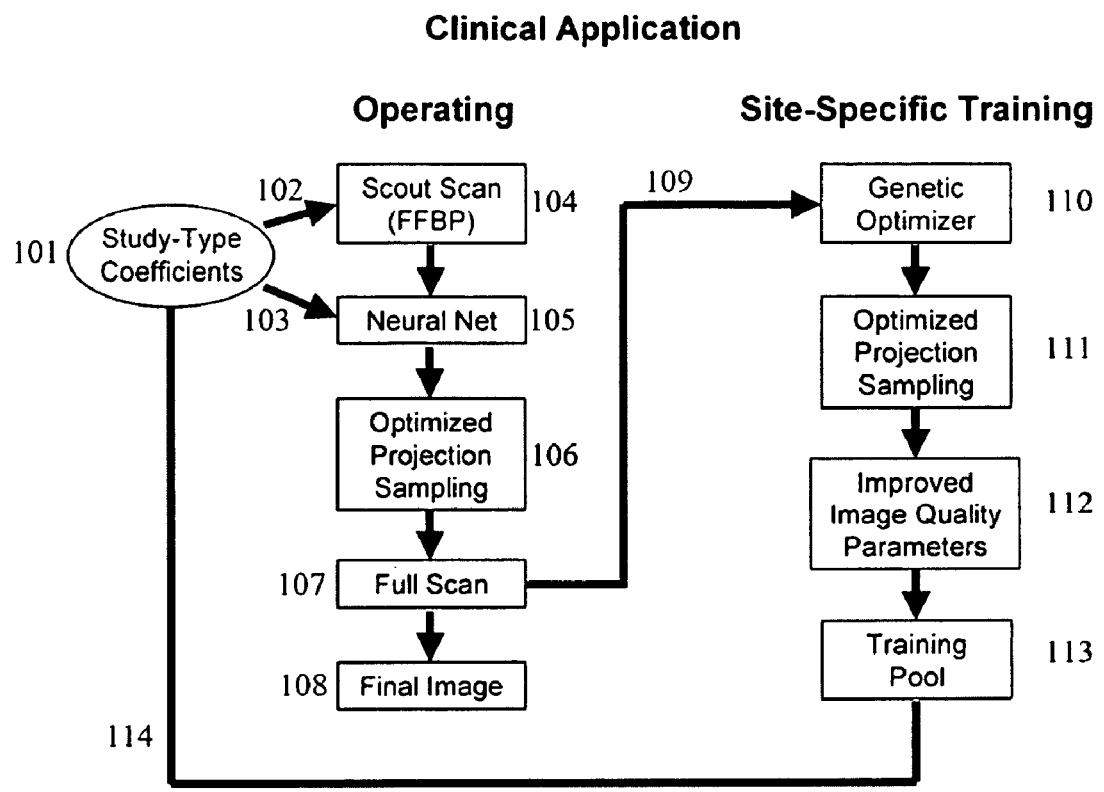
FIG. 1. Flowchart of optimized projection sampling approach in the acquisition of SPECT scans, showing site-specific training to account for site-dependent variables in the optimization process (right-hand column) as well as case/patient-specific optimization (left-hand column).
Figure 2:
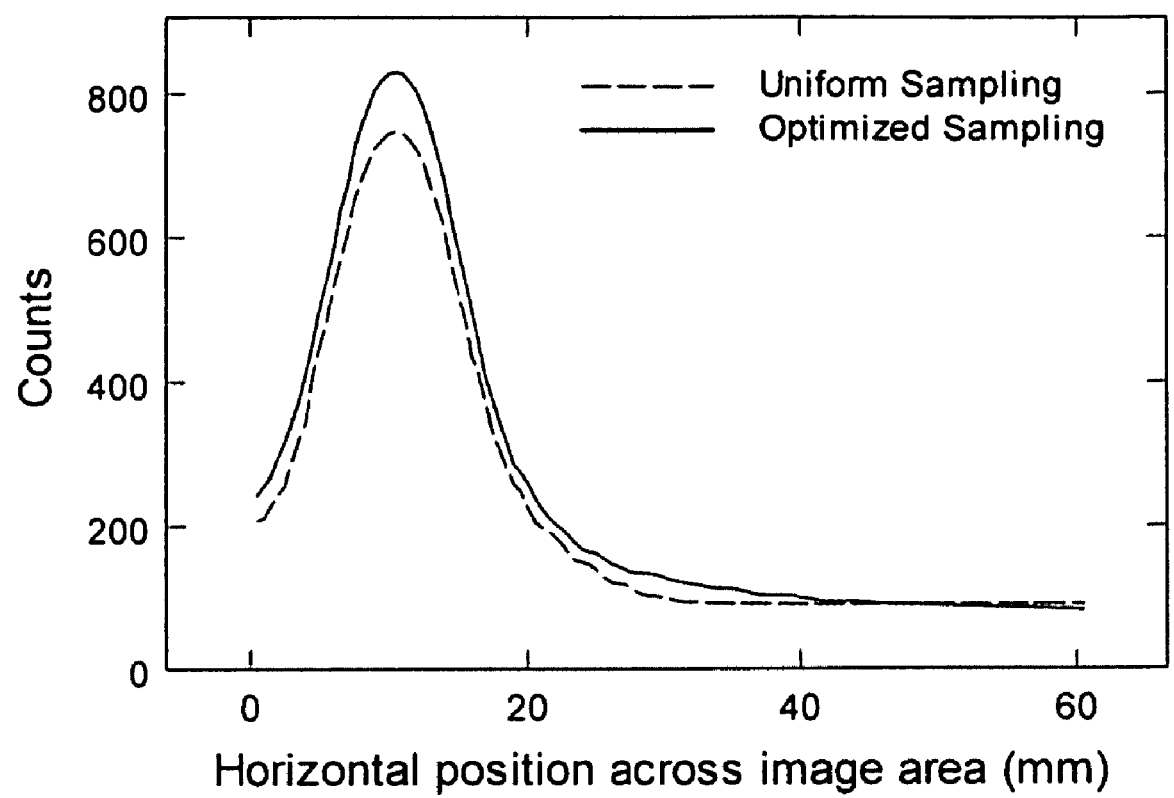
FIG. 2. Gamma-ray count profiles across a circular source distribution comparing back-projection reconstructions from a conventional SPECT system (uniform projection sampling) with one using optimized projection sampling. Scan rates are equal.

The following detailed description of exemplary embodiments of the invention makes reference to the accompanying drawings, which form a part hereof and in which are shown, by way of illustration, exemplary embodiments in which the invention may be practiced. The elements and features of the invention are designated by numerals throughout. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Clinical studies have only a limited time to acquire scanning data. It is therefore desirous to sample the projection data in a manner that advantageously utilizes the limited acquisition time. To be effective an optimized sampling should be directed at the patient specific source distribution and the specific objective of the imaging study. However, most imaging systems today treat all sampling angles equally, independent of their true case specific information content. We disclose a case specific SPECT data acquisition method. We disclose a system and method for SPECT imaging systems that provides improved signal to noise in the tomographic image specifically for clinically significant image features.

The propagation of noise to the tomographic image from the count density in the projection images is a non-linear process making optimization calculations difficult in the short times needed for application to clinical studies. In one embodiment we train a neural network 105 to process count densities along with other significant key parameters in the projection data as measured by a fast scout scan 104. The output of the neural net will provide the optimized acquisition parameters 106 for the longer subsequent data acquisition phase 107. Scout scan data may be added into the final tomographic reconstruction 108 to improve S/N. In one embodiment the neural net is trained first using a generic data set. Additional training is then accomplished using actual patient data at each individual clinical center, allowing for the specific protocols of each imaging center to be incorporated into the optimization process. In one embodiment genetic algorithms may be used to determine the optimal scan parameters 110 (after the fact) as input to the training part of the system.

Operation of acquiring an emission computed tomography image from a subject involves the setup of the subject within the field of view of a tomographic imaging system. Such an imaging system can be a rotational system that orbits the subject with one or more detector heads; or a system that rotates the subject within the field of view of a detector system; or a partial or full ring system that encircles the subject and samples by rotating the detectors, a collimator or the subject; or a system that changes detector field of view by moving detector elements; or a combination of these methods. Sampling can be step-by-step or continuous rotation or a combination thereof. The basic requirement to acquire a tomographic image reconstruction is to get complete or near complete angular sampling of the subject.

Normal protocol for tomographic data acquisition is to follow a protocol that defines, for example, sampling parameters such as dwell time, angular step size, angular range, number of counts per angle, or rotation speed 101. Different study protocols 101 may contain different sampling parameters depending on the nature of the study or the general characteristics of the subject. However, acquisition protocols have not adapted to the detailed data requirements of the individual subject. We disclose a method to allow the data from each individual subject to set the data acquisition parameters so that an improved final output may be achieved.

The subject is setup within the field of view of a tomographic imaging system using conventional procedures ascribed to the desired task. The acquisition system performs an initial fast scan of the subject 104, sometimes referred to as a scout scan. In one embodiment the time for the scout scan is about 5% of the target total time of the study. In one embodiment the scout scan can have less angular sampling than the secondary full scan and in another embodiment the data may be reformatted into a course pixel matrix.

A tomographic image can be computed from the scout scan data. This tomographic reconstruction, if desired for the particular type of study performed, may be accomplished using any method of tomographic reconstruction. From the scout scan data and from the tomographic reconstruction, if performed, a variety of parameters are deduced. These parameters are those that provide key information regarding the nature of the acquired data such as it's distribution in angular space, regions of high count density, regions of high spatial frequency and regions of low spatial frequency. The exact set of extracted parameters is that specified for this particular type of study. For example, for clinical imaging of human subjects, the key parameters for a cardiac perfusion study could be different from those for a bone study which could be different from those for a pulmonary embolism study. These parameters extracted from the scout scan data are representative of information content from the subject emission data. In one embodiment a template can be applied to the tomographic images produced from the scout scan above. Information is extricated from the images such as number of counts in a region. Region can be defined as, for example but not limited to, a known background region, an area of increased or decreased activity over background, or a shape associated with the organ of interest. From this other secondary indices can be computed such as, for example but not limited to, ratios of hot to cold, hot to background, cold to background, absolute or relative differences between hot to cold, hot to background or cold to background, or number of counts at different scan positions. Areas of non-uniformity can be defined as potential areas of interest.

In one embodiment a neutral network 105 has been programmed with appropriate parameters for the type of study being performed 103. One or more such extracted study parameters can be fed into a neural net trained to analyze the scan data and a resulting new set of acquisition parameters are produced as output of the neural network.

This new set of acquisition parameters 106 obtained as output from the neural network are now used as input acquisition parameters for the acquisition system and in one embodiment a second and immediate or nearly immediate data acquisition is performed with the subject not changing position. In another embodiment the subject is repositioned relative the system so that the new acquisition parameters will correlated to the original subject source distribution. This secondary scan occupies the remainder of the allotted study time or the remainder of the allotted counts or other termination parameter. The secondary scan 107 is completed and the data is input into a tomographic reconstruction computer 108. In one embodiment the original data can also be fed into the reconstruction computer and either singly or together a new tomographic image is computed. This produces an improved, subject-specific scan which is then used for analysis or diagnosis related to that specific subject. The final acquisition parameters have been modified according to the data from the individual subject, not determined by general subject study classification methods.

The neural network is trained by producing a series of representative case studies. These case studies are analyzed to provide a defining set of parameters related to the image quality or desired study objective. The data are further analyzed to determine what would have been the optimized acquisition parameters for that individual case. For training the neural net a more computationally intense method can be used than what would be practical during an actual subject examination. In post acquisition analysis the data set is analyzed 110 to compute if a better set of acquisition parameters would have produced a superior result. In addition new indices can be analyzed to see if they offer additional or superior predictive ability to the identification of optimal scan parameters. These new studies and/or new parameters are identified using potentially more computationally intense analysis methods.

The neural net can now be further trained 113 using this analyzed data to compute an improved set of coefficients for the neural net. This new set of coefficients can then be used in future acquisitions to provide better results 114. This new set can also reflect site specific variations in acquisition details or subject populations.

Ongoing training of the neural net using the new data in one embodiment of the method employs these steps:
  Acquire site specific patient data for each center
  Use, for example, a genetic algorithm to determine optimal sampling for each patient study
  Use these optimal patient acquisition parameters to train a site specific neural net
  Apply this neural net for optimizing new patient studies
  Continue to use acquired patient studies to further train and improve the neural net One objective of this method is to dynamically adjust and optimize the detector module orientations and other scan parameters using a fast initial scan (scout scan) coupled with an iterative learning program in order to optimize image quality and diagnostic results. This is accomplished by using the information content in the resulting images to optimize the projection sampling. FIG. 1 is a flowchart showing one embodiment of the basic elements of the proposed approach and how it would be implemented. A scout scan 104 is first acquired and a rudimentary image formed by a tomographic reconstruction method using, for example, fast filtered back-projection algorithm. Next, an artificial neural network 105 analyzes the information content in this image in addition to study-type coefficients from previous scans 103. The scan parameters for the full scan are computed 106. The full scan is acquired 107 and reconstructed to yield the final image 108.

In addition to this embodiment of the basic operating mode, a further embodiment will analyze the optimized scan parameters for each case/patient. In one embodiment a genetic algorithm optimizer 110 will evaluate this database to account for site-dependent variables in the optimization process 111, 112, 113.

Note that the method applied in the operating mode optimizes the SPECT scans for a specific case/subject (case-specific mode), whereas in the site-specific training the method optimizes the scans, for example, for a specific clinic setting (site-specific mode).

The methods herein described can be accomplished on a wide variety of computers. The computer can be any kind of CPU processor. Control of the systems and methods is implemented using a computer or equivalent such as a server, laptop, desktop, or a computer with single or multiple CPUs, and/or embedded CPU, application specific integrated circuit (ASIC), or field programmable gate array (FPGA).

In one embodiment, the method begins reconstruction by implementation of filtered back projection (FBP). That algorithm is well established and provides a standard reconstruction method commonly used in nuclear medicine imaging.

Other reconstruction methods may be used, for example, ordered subsets maximum likelihood estimation (OS-MLE) algorithm. This algorithm has been implemented elsewhere for truncated cardiac data where the (2D) sinogram data has sampling gaps.

Since high resolution imaging of the entire target will be impractical for scans of reasonable duration, the dwell times can be tailored to focus on source regions of greater intensity or importance within the target, and to neglect weak or unimportant source regions. For example, the dwell times can be short for target regions with low biological uptake (weak signal), but long for target regions with high biological uptake (strong signal) in order to provide the highest resolution for these regions. This approach runs contrary to typical acquisition methods, where both weak and strong source regions are scanned with the same acquisition time. The objective is therefore to determine the distribution of dwell times that provide maximal resolution within a fixed scan time. This dwell-time distribution will be a function of the source distribution and signal to noise, will vary for each subject scanned, and will be a diagnostically improved compromise between obtaining higher definition for localized sources and sufficient information for the remaining target regions as quickly and efficiently as practical.

The acquisition is divided into a pre-scan phase 104 and a data optimization phase 107. In one embodiment the pre-scan phase is of a short time in order to construct a lower quality rendition of the source distribution. This rendition is then used to compute the dwell times necessary for imaging localized source regions within the subject in the data optimization phase 105, 106. For example with a fixed sweep pattern, the variables for the data optimization scan can become the angular step size and the dwell time at each individual step. The dwell time will usually be a non-linear function of the tomographic image of the source distribution. A robust approach is therefore required to optimize the dwell times for an arbitrary source distribution and deal with the non-linearity of the process.

An intelligent sampling approach for dwell times can be achieved by several methods known to those skilled in the art. In one embodiment an iterative-correlation approach can be achieved by several methods known to those skilled in the art, where a range of simulated targets are tested with the dwell times varied and optimized iteratively. Correlations between the dwell time distributions and test targets are then be used to derive statistical relationships for selecting dwell times for an arbitrary source distribution.

Another embodiment is a genetic algorithm approach. Genetic algorithms provide efficient and robust methods for searching large parameter spaces for optimal solutions. The genetic algorithm can be used in a manner similar to process control and optimization.

In the genetic algorithm embodiment, the dwell times and step angles for an arbitrary target distribution would represent the parameter space to be searched for an optimum. A genetic algorithm will generally not be sufficiently fast for real-time computation of dwell times from a target distribution acquired from a pre-scan. Thus the genetic algorithm is used with a large sampling of representative target distributions to compute corresponding dwell-time distributions for a library or database. In one embodiment the pre-scan image will be compared and matched to the closest representative target using a feature recognition method such as principal components. The corresponding dwell-time step angle distribution (or its interpolation) would then be applied to the data optimization scan.

The ability to adaptively adjust the dwell times and step angles to each specific source distribution within a subject provides a new level of control in data acquisition and image resolution above current state of the art. Although the dwell-time distribution is unique for each target distribution, the combined information from the dwell times and image reconstructions provides for a quantitative measurement of radioisotope distributions within a subject.

Within one optimization round, operations and actions are performed pertinent to the selected optimization solver. For example, for a genetic algorithm, the main operations are parent selection, crossover, and mutation, whereas for a simulated annealing algorithm the main operations are perturbation and cooling. There is no restriction to any particular solver or optimization solver, and any of many types can be used. Examples include genetic algorithm (GA), simulated annealing (SA), tabu search (TS), and artificial neural network (ANN), genetic algorithm optimization, and classical optimizers such as SIMPLEX, branch and bound, gradient search, and outer approximation.

Combinatorial problems have a linear or nonlinear function defined over a set of solutions that is finite but very large. There are a number of significant categories of combinatorial optimization problems, including network problems, scheduling, and transportation. If the function is piecewise linear, the combinatorial problem can be solved exactly with a mixed integer program method, which uses branch and bound. Heuristic methods such as simulated annealing, tabu search, genetic algorithms, and others have also been successfully applied to these problems to find approximate solutions.

General unconstrained problems have a nonlinear function over real numbers that is unconstrained (or which have simple bound constraints). A variety of partitioning strategies have been proposed to solve this problem exactly. These methods typically rely on a priori knowledge of how rapidly the function can vary (e.g. the Lipshitz constant) or the availability of an analytic formulation of the objective function. Statistical methods also use partitioning to decompose the search space, but they use a priori information (or assumptions) about how the objective function can be modeled. A wide variety of other methods have been proposed for solving these problems inexactly, including simulated annealing, genetic algorithms, clustering methods, and continuation methods, that first transform the potential function into a smoother function with fewer local minima, and then use a local minimization procedure to trace the minima back to the original function.

General constrained problems have a nonlinear function over real numbers that is constrained. Many of the methods for unconstrained problems have been adapted to handle constraints.

The basic approach of the tabu search is to avoid entrainment in cycles by forbidding or penalizing moves which take the solution, in the next iteration, to points in the solution space previously visited (hence "tabu"). The tabu method was partly motivated by the observation that human behavior appears to operate with a random element that leads to inconsistent behavior given similar circumstances. The resulting tendency to deviate from a charted course might be regarded as a source of error but can also be regarded as a source of gain. The tabu method operates in this way except that new courses are not chosen randomly. Instead, the tabu search only accepts a new (poor) solution if acceptance is necessary to avoid a path already investigated. This insures new regions of a problem's solution space will be investigated with the goal of avoiding local minima and ultimately finding the desired solution.

The tabu search begins by marching to a local minima. To avoid retracing the steps used, the method records recent moves in one or more Tabu lists. The original intent of the list was not to prevent a previous move from being repeated, but rather to insure it was not reversed. The Tabu lists are historical in nature and form the Tabu search memory. The role of the memory can change as the algorithm proceeds. At initialization the goal is make a coarse examination of the solution space, known as 'diversification', but as candidate locations are identified the search is more focused to produce local optimal solutions in a process of 'intensification'. In many cases the differences between the various implementations of the tabu method have to do with the size, variability, and adaptability of the tabu memory to a particular problem domain.

The tabu search has traditionally been used on combinatorial optimization problems. The technique is straightforwardly applied to continuous functions by choosing a discrete encoding of the problem. Many of the applications in the literature involve integer programming problems, scheduling, routing, traveling salesman and related problems.

Branch and Bound is a general search method. Suppose we wish to minimize a function f(x), where x is restricted to some feasible region (defined, e.g., by explicit mathematical constraints). To apply branch and bound, one must have a means of computing a lower bound on an instance of the optimization problem and a means of dividing the feasible region of a problem to create smaller subproblems. There must also be a way to compute an upper bound (feasible solution) for at least some instances; for practical purposes, it should be possible to compute upper bounds for some set of nontrivial feasible regions.

The branch and bound method starts by considering the original problem with the complete feasible region, which is called the root problem. The lower-bounding and upper-bounding procedures are applied to the root problem. If the bounds match, then an optimal solution has been found and the procedure terminates. Otherwise, the feasible region is divided into two or more regions, each strict subregions of the original, which together cover the whole feasible region. Ideally, these subproblems partition the feasible region. These subproblems become children of the root search node. The algorithm is applied recursively to the subproblems, generating a tree of subproblems. If an optimal solution is found to a subproblem, it is a feasible solution to the full problem, but not necessarily globally optimal. Since it is feasible, it can be used to prune the rest of the tree: if the lower bound for a node exceeds the best known feasible solution, no globally optimal solution can exist in the subspace of the feasible region represented by the node. Therefore, the node can be removed from consideration. The search proceeds until all nodes have been solved or pruned, or until some specified threshold is met between the best solution found and the lower bounds on all unsolved subproblems.

Evolutionary algorithms (EAs) are search methods that utilize a form of natural selection and survival of the fittest. EAs differ from more traditional optimization techniques in that they involve a search from a "population" of solutions, not from a single point. Each iteration of an EA involves a competitive selection that weeds out poor solutions. The solutions with high "fitness" are "recombined" with other solutions by swapping parts of a solution with another. Solutions are also "mutated" by making a small change to a single element of the solution. Recombination and mutation are used to generate new solutions that are biased towards regions of the space for which good solutions have already been seen. Pseudo-code for a genetic algorithm is as follows:

Initialize the population
    Evaluate initial population
    Repeat
    Perform competitive selection
    Apply genetic operators to generate new solutions
    Evaluate solutions in the population
    Iterate until some convergence criteria is satisfied Several different types of evolutionary search methods were developed independently. These include (a) genetic programming (GP), which evolve programs, (b) evolutionary programming (EP), which focuses on optimizing continuous functions without recombination, (c) evolutionary strategies (ES), which focuses on optimizing continuous functions with recombination, and (d) genetic algorithms (GAs), which focuses on optimizing general combinatorial problems.

EAs are often viewed as a global optimization method although convergence to a global optimum is only guaranteed in a weak probabilistic sense. However, one of the strengths of EAs is that they perform well on "noisy" functions where there may be multiple local optima. EAs tend not to get "stuck" on local minima and can often find globally optimal solutions. EAs are well suited for a wide range of combinatorial and continuous problems, though the different variations are tailored towards specific domains:

GPs are well suited for problems that require the determination of a function that can be simply expressed in a function form
    ES and EPs are well suited for optimizing continuous functions
    GAs are well suited for optimizing combinatorial problems (though they have occasionally been applied to continuous problems)

The recombination operation used by EAs requires that the problem can be represented in a manner that makes combinations of two solutions likely to generate interesting solutions. Consequently selecting an appropriate representation is a challenging aspect of applying these methods.

EAs have been successfully applied to a variety of optimization problems such as wire routing, scheduling, traveling salesman, image processing, engineering design, parameter fitting, computer game playing, knapsack problems, and transportation problems. The initial formulations of GP, ES, EP and GAs considered their application to unconstrained problems. Although most research on EAs continues to consider unconstrained problems, a variety of methods have been proposed for handling constraints.

Simulated annealing is a generalization of a Monte Carlo method for examining the equations of state and frozen states of n-body systems. The concept is based on the manner in which liquids freeze or metals re-crystallize in the process of annealing. In an annealing process a melt, initially at high temperature and disordered, is slowly cooled so that the system at any time is approximately in thermodynamic equilibrium. As cooling proceeds, the system becomes more ordered and approaches a "frozen" ground state at T=0. Hence the process can be thought of as an adiabatic approach to the lowest energy state. If the initial temperature of the system is too low or cooling is done insufficiently slowly the system may become quenched forming defects or freezing out in metastable states (i.e. trapped in a local minimum energy state).

The original scheme was that an initial state of a thermodynamic system was chosen at energy E and temperature T. Holding T constant, the initial configuration is perturbed and the change in energy dE is computed. If the change in energy is negative the new configuration is accepted. If the change in energy is positive it is accepted with a probability given by the Boltzmann factor $\exp(-(dE/T))$. This processes is then repeated sufficient times to give good sampling statistics for the current temperature, and then the temperature is decremented and the entire process repeated until a frozen state is achieved at T=0.

By analogy the generalization of this Monte Carlo approach to combinatorial problems is straight forward. The current state of the thermodynamic system is analogous to the current solution to the combinatorial problem, the energy equation for the thermodynamic system is analogous to the objective function, and the ground state is analogous to the global minimum. The major difficulty in implementing the algorithm is that there is no obvious analogy for the temperature T with respect to a free parameter in the combinatorial problem. Furthermore, avoidance of entrainment in local minima (quenching) is dependent on the "annealing schedule", the choice of initial temperature, how many iterations are performed at each temperature, and how much the temperature is decremented at each step as cooling proceeds.

Simulated annealing has been used in various combinatorial optimization problems and has been particularly successful in circuit design problems.

Clustering global optimization methods can be viewed as a modified form of the standard multistart procedure, which performs a local search from several points distributed over the entire search domain. A drawback of multistart is that when many starting points are used the same local minimum may be identified several times, thereby leading to an inefficient global search. Clustering methods attempt to avoid this inefficiency by carefully selecting points at which the local search is initiated. The three main steps of clustering methods are: (1) sample points in the search domain, (2) transform the sampled point to group them around the local minima, and (3) apply a clustering technique to identify groups that (hopefully) represent neighborhoods of local minima. If this procedure successfully identifies groups that represent neighborhoods of local minima, then redundant local searches can be avoided by simply starting a local search for some point within each cluster.

Clustering methods have been developed for optimizing unconstrained functions over reals. These methods assume that the objective function is relatively inexpensive because many points are randomly sampled to identify the clusters. Clustering methods are most effective for low dimensional problems, so these methods become less effective for problems of more than a few hundred variables.

Statistical global optimization algorithms employ a statistical model of the objective function to bias the selection of new sample points. These methods are justified with Bayesian arguments that suppose that the particular objective function that is being optimized comes from a class of functions that is modeled by a particular stochastic function. Information from previous samples of the objective function can be used to estimate parameters of the stochastic function, and this refined model can subsequently be used to bias the selection of points in the search domain.

This framework is designed to cover average conditions of optimization. One of the challenges of using statistical methods is the verification that the statistical model is appropriate for the class of problems to which they are applied. Additionally, it has proved difficult to devise computationally interesting versions of these algorithms for high dimensional optimization problems.

Virtually all statistical methods have been developed for objective functions defined over the real numbers. Statistical methods generally assume that the objective function is sufficiently expensive that it is reasonable for the optimization method to perform some nontrivial analysis of the points that have been previously sampled. Many statistical methods rely on dividing the search region into partitions. In practice, this limits these methods to problems with a moderate number of dimensions.

Statistical global optimization algorithms have been applied to some challenging problems. However, their application has been limited due to the complexity of the mathematical software needed to implement them.

Additional methods such as Simplex, LP, NLP, MNLP are known by those skilled in the art and are equivalents to the optimization methods described. The above descriptions of optimization methods, including preferred embodiments, are to be construed as merely illustrative and not a limitation of the scope of the present invention in any way. It will be obvious to those having skill in the art that many changes may be made to the details of the above-described embodiments without departing from the underlying principles of the invention. It will be appreciated that the methods mentioned or discussed herein are merely examples of means for performing optimization and it should be appreciated that any means for performing optimization which performs functions the same as, or equivalent to, those disclosed herein are intended to fall within the scope of a means for optimization, including those means or methods for optimization which may become available in the future. Anything which functions the same as, or equivalently to, a means for optimization falls within the scope of this element.

What is claimed is:

1. A method for acquiring emission data within a total study time from an emission source of interest in a SPECT scan, comprising:

acquiring a scout scan of emission data from a subject of interest;

extracting parameters from said scout scan data representative of information content from said emission data;

analysis of said parameters producing new acquisition parameters for acquisition of emission data from the subject of interest;

acquiring a second set of emission data from the subject of interest using said new acquisition parameters; and wherein said analysis is performed using a neural network.

2. The method of claim 1 further comprising:

analyzing said second set of emission data in a computer running an optimization program to determine optimal acquisition parameters; and using said optimal acquisition parameters as training data for said neural network.

3. The method of claim 2 wherein:

said optimization program is a genetic algorithm.

4. The method of claim 2 wherein:

said optimization analysis program is a simulated annealing algorithm.

5. The method of claim 2 wherein:

said optimization analysis program is a evolutionary search algorithm.

6. The method of claim 2 wherein:

said training data is site and study type specific.

7. The method of claim 1 wherein:

said scout scan is accomplished in less than 5% of the total study time.

8. The method of claim 1 wherein:

said scout scan is accomplished in between 5% to 10% of the total study time.

9. The method of claim 1 wherein:

said scout scan is accomplished in between 10% to 20% of the total study time.

10. The method of claim 1 wherein:

said subject of interest is a human being.

11. The method of claim 10 wherein:

said emission data is from a nuclear medicine study.

12. The method of claim 11 wherein:

said emission data is from a nuclear cardiology study.

13. The method of claim 11 wherein:

said emission data is from a nuclear bone study.

14. A method for acquiring emission data from a subject of interest in a SPECT scan, comprising:

acquiring a scout scan of emission data from a subject of interest;

extracting parameters from said scout scan data representative of information content from said emission data;

inputting said parameters into a neural network analysis program running on a computer;

said neural network analysis program computing new acquisition parameters for acquisition of emission data from the subject of interest;

acquiring a second set of emission data from the subject of interest using said new acquisition parameters;

computing a tomographic reconstruction of the emission source;

analyzing said tomographic reconstruction of the emission source in a computer running an optimization analysis program to determine optimal acquisition parameters; and using said optimal acquisition parameters as future training data for said neural network analysis program.

15. The method of claim 14 wherein:

said optimization analysis program is a genetic algorithm.

16. The method of claim 14 wherein:

said optimization analysis program is a simulated annealing algorithm.

17. The method of claim 14 wherein:

said optimization analysis program is a evolutionary search algorithm.

18. The method of claim 14 wherein:

said optimization analysis program is a clustering global optimization algorithm.

19. The method of claim 14 wherein:

said optimization analysis program is a statistical global optimization algorithm.

* * * * *